United States Patent
Paul

(10) Patent No.: US 10,169,397 B2
(45) Date of Patent: Jan. 1, 2019

(54) SYSTEMS AND METHODS FOR REMOTE CORRECTION OF INVALID CONTACT FILE SYNTAX

(71) Applicant: Synchronoss Technologies, Inc., Bridgewater, NJ (US)

(72) Inventor: Sumeet Singh Paul, Evanston, IL (US)

(73) Assignee: Synchronoss Technologies, Inc., Bridgewater, NJ (US)

( * ) Notice: Subject to any disclaimer, the term of this patent is extended or adjusted under 35 U.S.C. 154(b) by 338 days.

(21) Appl. No.: 15/157,536

(22) Filed: May 18, 2016

(65) Prior Publication Data

US 2016/0342642 A1  Nov. 24, 2016

Related U.S. Application Data

(60) Provisional application No. 62/164,330, filed on May 20, 2015.

(51) Int. Cl.
  *G06F 17/30*  (2006.01)
  *G06F 7/00*  (2006.01)

(52) U.S. Cl.
  CPC .. *G06F 17/30371* (2013.01); *G06F 17/30115* (2013.01); *G06F 17/30377* (2013.01)

(58) Field of Classification Search
  CPC ......... G06F 17/30371; G06F 17/30115; G06F 17/30377

USPC ........................................................ 707/691
  See application file for complete search history.

(56) References Cited

U.S. PATENT DOCUMENTS

| | | | |
|---|---|---|---|
| 9,779,063 B1* | 10/2017 | Dykema | G06F 17/211 |
| 2007/0112880 A1* | 5/2007 | Yang | G06F 17/30581 |
| 2013/0067017 A1* | 3/2013 | Carriere | G06Q 10/06 709/208 |
| 2013/0210468 A1* | 8/2013 | Lowther | H04W 4/12 455/466 |
| 2014/0075004 A1* | 3/2014 | Van Dusen | H04L 41/04 709/223 |
| 2015/0347552 A1* | 12/2015 | Habouzit | G06F 17/30174 707/613 |
| 2016/0328796 A1* | 11/2016 | Acuna-Rohter | G06Q 10/107 |

* cited by examiner

*Primary Examiner* — Kuen S Lu
(74) *Attorney, Agent, or Firm* — Synchronoss Technologies, Inc.; Frederick W. Dour

(57) ABSTRACT

A method of remote correction of invalid contact file syntax is disclosed. The method comprising receiving a file comprising information associated with one or more contacts; attempting to import the received file on a target device; in response to an import failure: depersonalizing the received file of contact information; identifying a location within one or more contacts the depersonalized file which caused the import failure, wherein the location is stored as metadata; transmitting the depersonalized file and the metadata to a remote server for repair; and receiving a repaired depersonalized file; repairing the received file of contacts based on the repaired depersonalized file; and importing the file of contacts on the target device.

20 Claims, 5 Drawing Sheets

SYSTEMS AND METHODS FOR REMOTE CORRECTION OF INVALID CONTACT FILE SYNTAX

CROSS-REFERENCE TO RELATED APPLICATIONS

This application claims benefit of U.S. Provisional Patent Application Ser. No. 62/164,330, filed May 20, 2015, which is herein incorporated by reference in its entirety.

BACKGROUND

Field

Embodiments consistent with the present invention generally relate to systems and methods for repairing corrupted files, and more specifically to a system and method for remote correction of invalid contact file syntax.

Description of the Related Art

Users of computing devices (e.g., laptops, tablets, cellular phones, and personal digital assistants) often share electronic address books. Protocols are designed to allow users to access and share contact data. However, vendors are not always entirely compliant when using the protocols. When sharing an address book of contacts between two devices, the address book is exported from a source device, and is transmitted to a target device where the address book is imported. The imported address book may be incomplete or corrupted if for example, the database where the address book is stored on the source device is corrupted.

Alternatively, and more likely, the address book data is technically correct; however, the target device does not recognize, for example, special characters in the contact information that are recognizable to the source device. This is often the case when the address book is shared across different vendors, for example from a SAMSUNG® device to an APPLE® device. For example, many devices are unable to recognize special characters/symbols such as a tilde (~) character. On such devices, attempting to import the special character/symbol in a contact string may cause the contact information to be truncated, leaving an incomplete contact entry. For example, the contact name may be blank, which causes a problem when the contact is accessed on the target device. As such, the contact becomes difficult or impossible to use.

Currently, to resolve these import/export issues, the software vendor updates the import software for each discovered issue. However, this is inconvenient for both the software developer who must update the software as well as the end-user who must download the updated software. In addition, software updates may only be performed quarterly or biannually, leaving an end-user to deal with the issue until a next software update is released. This is an unacceptable solution for millions of end-users.

A need therefore exists for systems and methods for remote correction of invalid contact file syntax.

SUMMARY

A method and system for remote correction of invalid contact file syntax is provided.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Other and further embodiments of the present invention are described below.

BRIEF DESCRIPTION OF THE DRAWINGS

So that the manner in which the above recited features of embodiments of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

Figure 1:
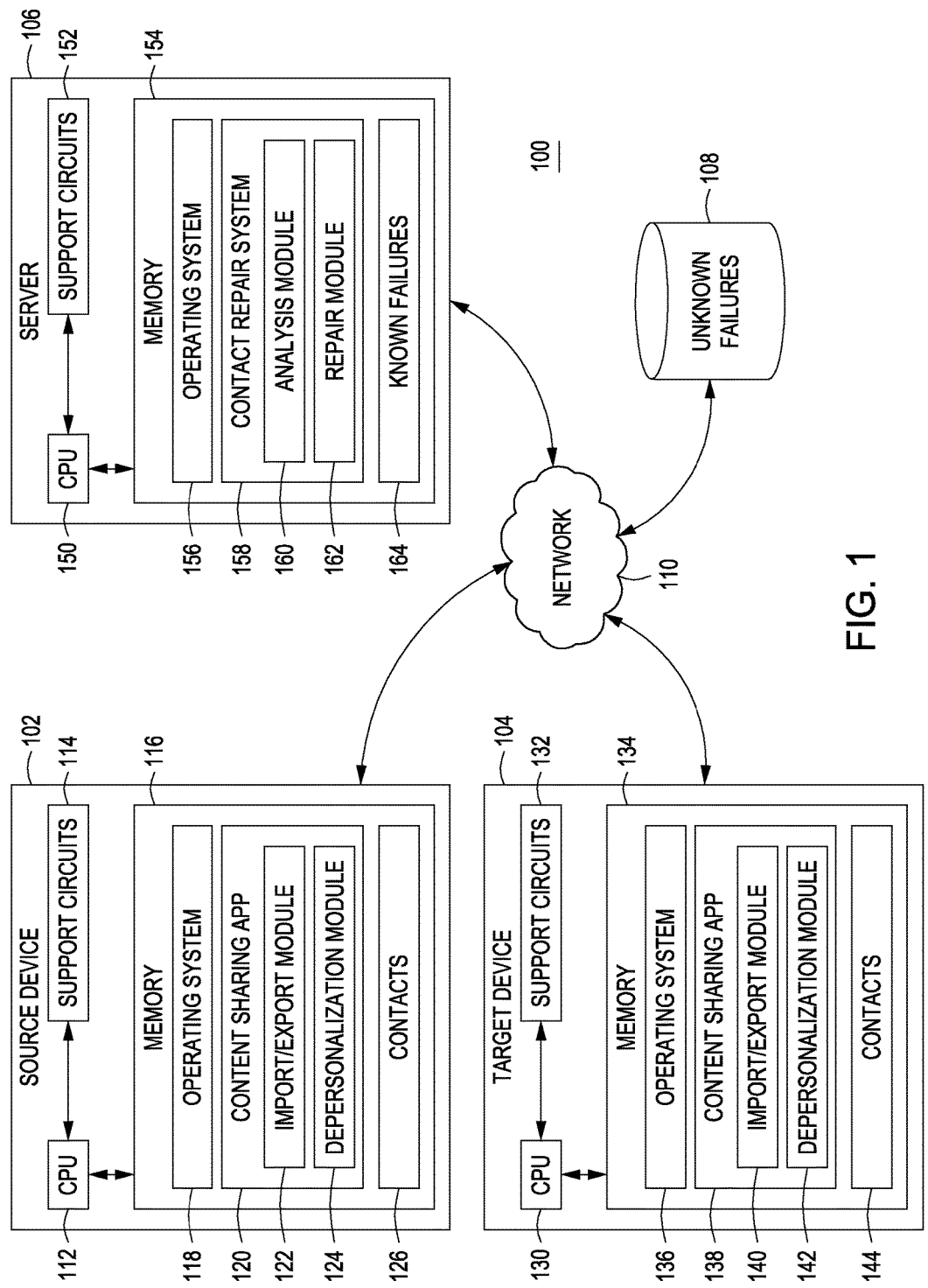
FIG. 1 is a block diagram depicting a system configured for remote correction of invalid contact file syntax, according to one or more embodiments of the invention.

To facilitate understanding, identical reference numerals have been used, where possible, to designate identical elements that are common to the figures. The figures are not drawn to scale and may be simplified for clarity. It is contemplated that elements and features of one embodiment may be beneficially incorporated in other embodiments without further recitation.

DETAILED DESCRIPTION

Embodiments of the present invention include a system and method for remote correction of invalid contact file syntax. A file of contacts is exported from a source device and transmitted to a target device. The target device attempts to import the file, and if successful, performs a verification to ensure the imported file is indeed correct. However if a failure occurs while importing the file or the verification shows an error, the cause of the failure (e.g. an unrecognized character in the contact) is identified locally and the file is transmitted to a server for repair. If the cause of the failure has been previously identified, the file is repaired at the server and returned to the target device. However, if the cause of the failure has not yet been determined, the file is transmitted to a database for investigation. Upon manual determination of a solution to the failure under investigation, the solution to resolve the failure is stored at the server, such that if a subsequent failure occurs for the same reason, the repair may be made at the server, thereby alleviating the need for an end-user to wait for a software update to repair the issue.

Various embodiments of systems and methods for remote correction of invalid contact file syntax are provided below. In the following detailed description, numerous specific details are set forth to provide a thorough understanding of the claimed subject matter. However, it will be understood by those skilled in the art that claimed subject matter may be practiced without these specific details.

Some portions of the detailed description which follow are presented in terms of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

FIG. 1 is a block diagram depicting a system 100 configured for remote correction of invalid contact file syntax, according to one or more embodiments of the invention. The various components of system 100 include a source device 102 and a target device 104 communicatively connected via one or more network links. Some of the network links are established by a network 110, such as a Wide Area Network (WAN) or Metropolitan Area Network (MAN), which includes a communication system that connects computers (or devices) by wire, cable, fiber optic and/or wireless link facilitated by various types of well-known network elements, such as hubs, switches, routers, and the like. The network interconnecting some components may also be part of a Local Area Network (LAN) using various communications infrastructure, such as Ethernet, Wi-Fi, a personal area network (PAN), a wireless PAN, Bluetooth, Near field communication, and the like.

Figure 5:
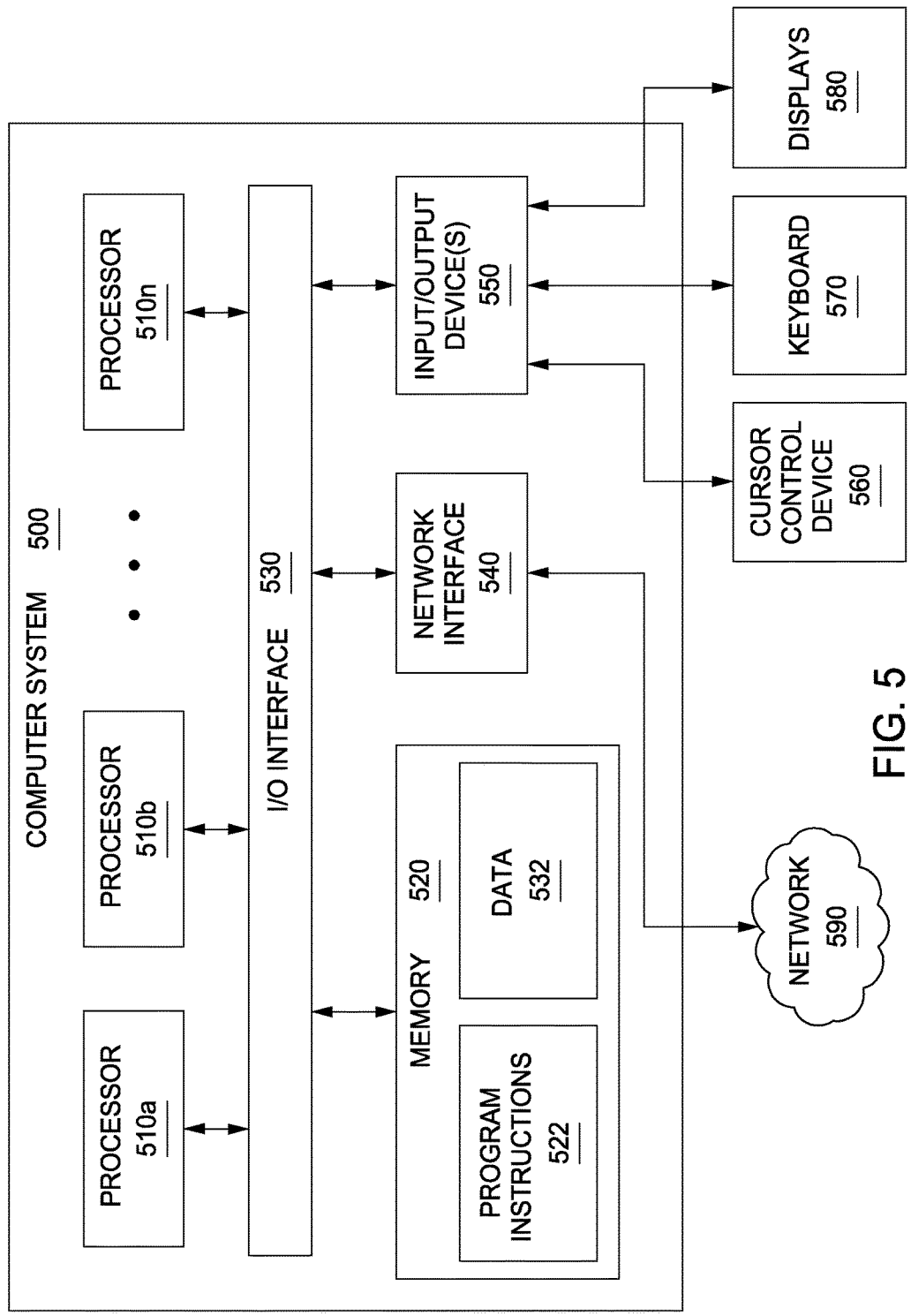
FIG. 5 is a detailed block diagram of a computer system, according to one or more embodiments.

The server 106 is a computing device, for example, a desktop computer, laptop, tablet computer, and the like, or it may be a cloud based server e.g., a blade server, virtual machine, and the like. One example of a suitable computer is shown in FIG. 5, which will be described in detail below. According to some embodiments, the server 106 includes a contact repair system 158 that includes an analysis module 160 and a repair module 162, both comprising a set of instructions residing in memory 154 and executable by a Central Processing Unit (CPU) 150. The CPU 150 may include one or more commercially available microprocessors or microcontrollers that facilitate data processing and storage. Various support circuits 152 facilitate the operation of the CPU 150 and include one or more clock circuits, power supplies, cache, input/output circuits, and the like. The memory 154 includes at least one of Read Only Memory (ROM), Random Access Memory (RAM), disk drive storage, optical storage, removable storage and/or the like.

In addition to contact repair system 158, the memory 154 includes an operating system 156 and a database of known failures 164. In some embodiments, the database of known failures 164 includes information regarding solutions or fixes to previously repaired import failures. The information is aggregated based on a specific make, model, firmware version, and the like for the device on which the failure occurred (and for which a solution has been found). A database of unknown failures 108 may collect data regarding failures that occurred on a device but have yet to be identified and as such, a solution to the failure not yet provided. The database of unknown failures 108 is similarly aggregated based on a specific make, model, firmware version, and the like where the failure occurred. Once a solution to an unknown failure is determined, the entry in the database of unknown failures 108 is deleted and the solution for the failure is stored in the database of known failures 164. The database of unknown failures 108 is shown remote from server 106; however, in some embodiments, the database of unknown failures 108 may reside on server 106.

In some embodiments, the server 106 interacts with source device 102 and/or target device 104 via a communication network 110. Source device 102 and target device 104 may be implemented with computer workstations, personal digital assistants (PDAs), mobile telephones or any other devices capable of sharing content. Both the source device 102 and target device 104 include one or more processors as CPU 112 and 130, respectively, support circuits 114 and 132, and a memory 116 and 134 containing an operating system 118 and 136, and a content sharing application 120 and 138, such as Synchronoss Personal Cloud®. An app distribution server (not shown) may be an external entity that distributes apps for a variety of developers (e.g., APPLE® APP STORES℠, GOOGLE® Play, and the like), or it may be an internal entity that distributes their own apps. End users of source device 102 and target device 104 may download and install the content sharing app 120/138 on their respective devices from the app distribution server.

In some embodiments, the content sharing application 120/138 includes an import/export module 122 and 140 and a depersonalization module 124 and 142 configured, by execution of instructions by CPU 112 and 130 respectively, to export contacts from source device 102 to be imported on target device 104 or vice versa. Both the source device 102 and target device 104 also include a database of contacts 126 and 144 respectively.

Source device 102 and target device 104 are shown coupled to the network 110. Of course, aspects of the invention may work with other networks. In one embodiment of the invention, the source device 102 and target device 104 are connected to a local area network and exchange data using a peer-to-peer protocol.

When a user of source device 102 shares contacts 126 with target device 104, the import/export module 122 on the source device 102 exports the contacts 126. The file of contacts 126 is transmitted to target device 104, where the import/export module 140 attempts to import the file to contacts 144. If the import into contacts 144 is successful, the import/export module 140 verifies that the import was indeed successful by exporting the contacts 144 and comparing the exported contacts 144 to the file received from the source device 102. If the files do not match, or if the initial attempt to import the contacts failed, the exact contact or contacts that caused the failure are determined. The depersonalization module 142 removes any identifying information from the file and generates metadata that identifies the location of one or more contacts in the file that caused a failure. The depersonalized file and metadata are transmitted to the server 106 along with the make, model, and firmware version number of the device where the import failed (i.e. target device 104).

The contact repair system 158 receives the depersonalized file. The analysis module 160 determines from the metadata exactly what caused the import failure. The analysis module 160 then determines whether a solution is stored in the database of known failures 164. For example, it may have been discovered that the tilde character is unrecognizable by a Samsung® Galaxy X7 cell phone. If a solution is found in the database of known failures 164 for the failure on the target device, the repair module 162 repairs the depersonalized file using the solution found in the database of known failures 164. The analysis module 160 determines whether a solution is available for each failure and if no solution is found in the database of known failures 164, the analysis module 160 transmits the file to the database of unknown failures 108 along with the make, model, and firmware version number for the device where the import failed. However, if all failures could be repaired, the repair module 162 transmits the repaired depersonalized file to the target device 104. The import/export module 140 corrects the original file received from the source device 102 and imports the file into the database of contacts 144.

Figure 2:
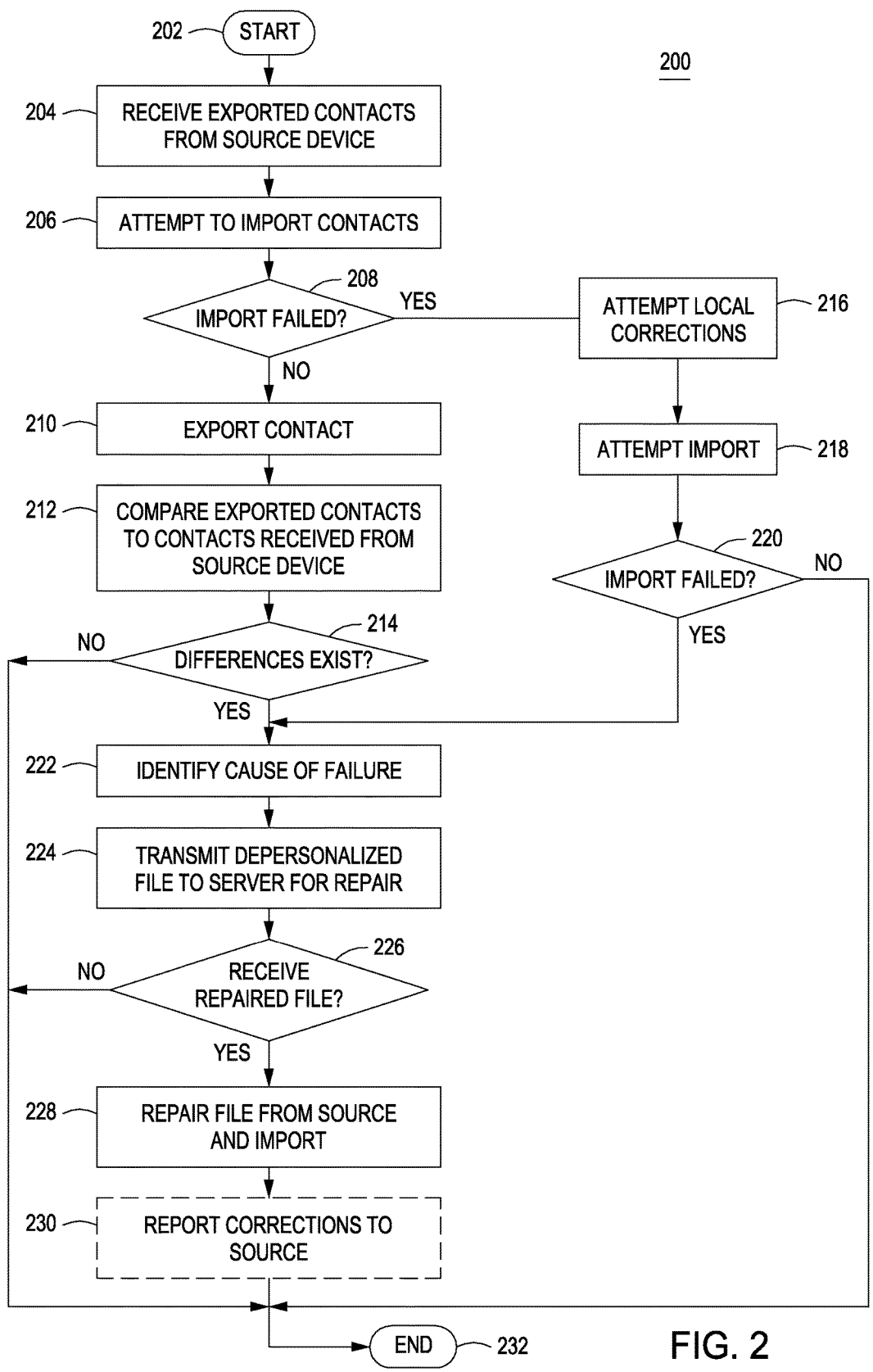
FIG. 2 is a flow diagram depicting a method for identifying whether importing failures exist in a contact file, according to one or more embodiments of the invention.

FIG. 2 is a flow diagram depicting a method 200 for identifying whether importing failures exist in a contact file, according to one or more embodiments of the invention. Prior to the initiation of the method 200, contacts are exported from a source device. The file is transferred from the source device to a target device. The method 200 starts at step 202, and proceeds to 204.

At 204, the exported file of contacts is received from the source device. The contacts are exported in a standard format, for example SyncML. SyncML is an open industry specification for universal data synchronization. The received file may include a single contact or a plurality of contacts. At step 206, an attempt is made to import the received one or more contacts. The import may fail because the file is corrupted, the import may fail because the device is unable to recognize all of the characters in the file, the import may appear to succeed even though the imported contacts may have errors, or the import may simply succeed.

At step 208, it is determined whether the import failed. If it is determined the import did not fail, then at step 210, the contacts are exported. Exporting the contacts is done to verify that the import was indeed successful. At step 212, the exported contacts are compared to the file of contacts received from the source device. If the import was successful, the files will be identical. At step 214, it is determined whether any differences exist between the two files. If no differences exist, then the file was successfully imported and the method 200 ends at step 232. However, if it is determined that differences exist between the two files, then the method 200 proceeds to step 222.

If at step 208, it is determined that the import has failed, then at step 216, correction of the failure is attempted. If the failure was previously known and the developers included a fix in an updated software release, it may be possible to repair the failure locally on the target device. As such, a local repair is performed and at step 218 an import is attempted again. At step 220, it is determined whether the import failed. If the import did not fail, then the method proceeds to step 232 where the method 200 ends. However, if at step 220, it is determined that the import failed, the method proceeds to step 222.

At step 222, the file is analyzed to determine the cause of the import failure. The file is depersonalized and each contact is tested for import failures, as described in further detail with respect to FIG. 3 below. At step 224, the make, model, and firmware version number of the target device is included with the information identifying the cause(s) of the import failure. The information regarding the device and the identified causes of the import failure as well as the depersonalized file are transmitted to the server such that the server may attempt to repair the depersonalized file based on the metadata identifying the causes for failure as described in further detail with respect to FIG. 4 below.

At step 226, it is determined whether a repaired depersonalized file was received from the server. If the file could not be repaired because no solution to the failure could be found, then at step 232, the method ends without the contact file being imported. However, if at step 226, a repaired file is received, then at step 228, the file that was received from the source device is repaired based on the repairs received from the server and the repaired file is imported. Optionally, at step 230, the corrections made to the file are reported to the source device. The method ends at step 232.

Figure 3:
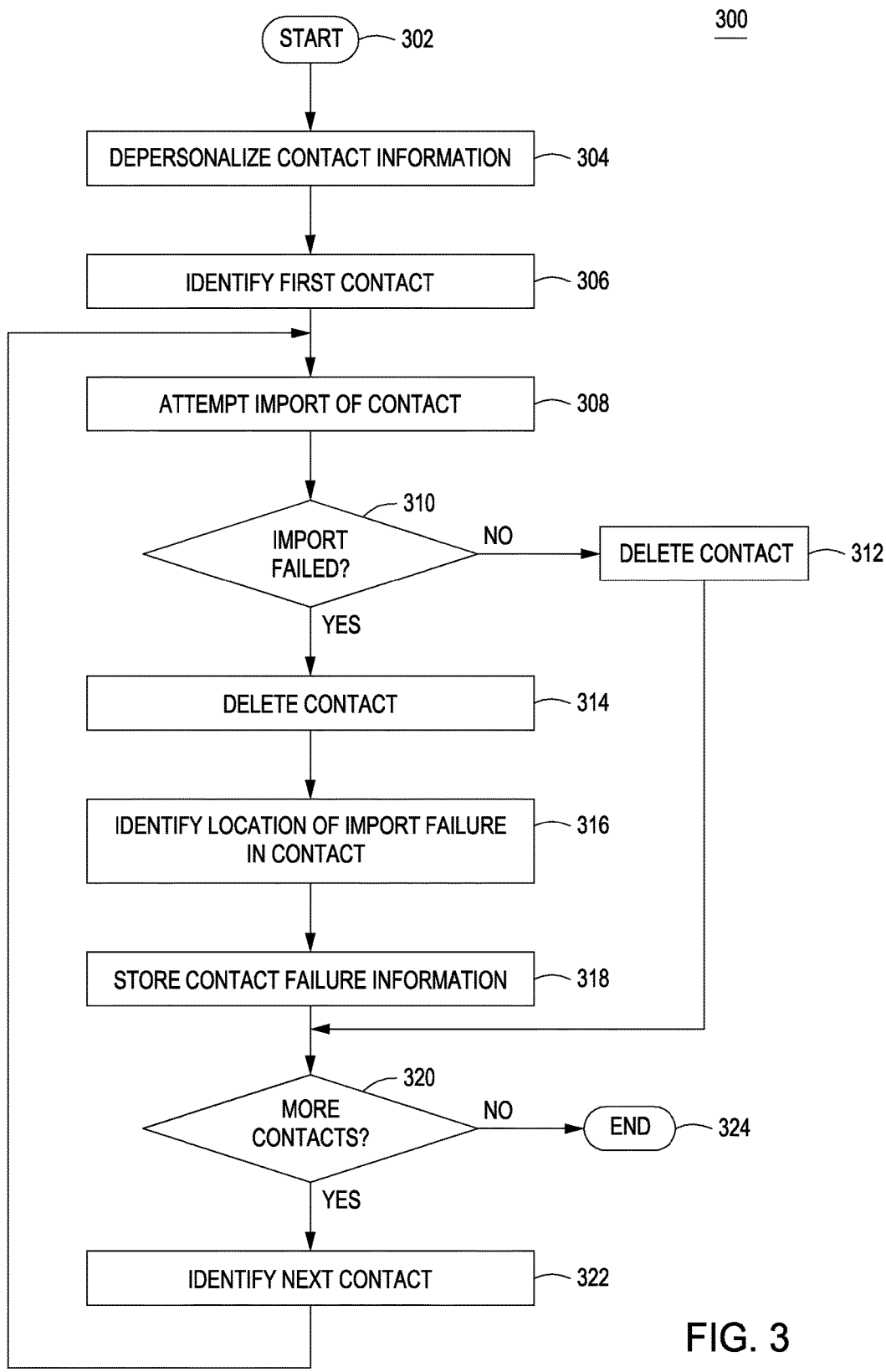
FIG. 3 is a flow diagram depicting a method for an algorithm for identifying a location of one or more failures in a contact file, according to one or more embodiments of the invention.

FIG. 3 is a flow diagram depicting a method for an algorithm for identifying a location of one or more failures in a contact file, according to one or more embodiments of the invention. The method starts at step 302 and proceeds to step 304.

At step 304, the file received from the source device is depersonalized. Depersonalization is performed to remove any contact information that may be sensitive. Due to the fact that the contact information may need to be repaired at a remote server, if the contact information includes addresses and phone numbers of prominent citizens, their contact information could be compromised. As such, the file is depersonalized using a one-way hash.

The one-way hash is performed by randomized character replacement for regular alpha numeric characters, while leaving special characters and punctuation unchanged. For example, a contact with a name of Smith & Sons is depersonalized. The "S" in Smith is alpha-numeric. As such, a randomly selected alpha-numeric character is selected to replace the "S", for example the letter "g". This randomized character replacement is performed for each letter in Smith, which may produce "gLywX". The "&" symbol is a special character, and is therefore not replaced. However, the next character "S" is Sons must be replaced with a randomly selected alpha-numeric character, for example, "M". The process continues until Smith & Sons is replaced by, for example, "gLywX & MPqt". During the depersonalization process, symbols and punctuation are maintained. In some embodiments, dates are modified to change the month and day, while maintaining the year. In some embodiments, all alpha-numeric characters are replaced. The randomized character replacement is performed on the entire file received from the source device.

At step 306, the first contact is identified in the depersonalized file and at step 308, an attempt is made to import the first contact. At this step, the first contact is depersonalized and so the contact information is meaningless. However, the first contact is imported to determine whether the issue that caused the file import to fail exists in the first contact.

At step 310, it is determined whether the import of the contact failed. If the import did not fail, then at step 312, the contact is deleted. The contact is deleted strictly for housekeeping purposes. Since the contact is depersonalized, the information is meaningless, but it can be concluded that the issue that caused the file import failure does not exist in this contact. The method proceeds to step 320. However, if it is determined at step 310 that the import did fail, then at step 314 the contact is delete, again for housekeeping and at step 316, the specific location within the contact (i.e., the character or characters that caused the failure) is identified.

At step 316, the original contact that was received from the source device is tested. The algorithm replaces one alpha-numeric character of the contact and attempts to import the contact. For example, if a name string of a contact is Smith & Sons, the "S" in Smith is randomly replaced as described above, with for example the character "g". An attempt is made to import the contact with the name string of "gmith & Sons". If the contact imports successfully, then the second alpha-numeric character is randomly replaced and a second attempt is made to import the contact, for example "Swith & Sons", and so on. In some embodiments, if attempts of single character replacement are successful, then the process is reported with two characters replaced at one time, and then three characters at once, until the entire contact is replaced and successfully imported.

At step 318, the results of the import test of step 316 are stored. If the entire contact, depersonalized, is successfully imported, information stating such is stored as metadata in, for example an XML file, although any file format may be used. However, if during the process a failure occurs, for example, if during two character replacement, the name string of "SmTWh & Sons" causes an import failure, the information identifying that the third and fourth characters of the first contact, Smith (i.e., the characters "it") caused the import to fail when they were replaced by "TW". If the "&" character caused the import to fail, then information identifying the "&" is stored.

At step 320, it is determined whether there are more contacts in the depersonalized file. If more contacts exist, then at step 322, the next contact is identified and the process proceeds to step 308 and iterates until at step 320 no more contacts exist, the method ends at step 324. At the conclusion of method 300 metadata is stored in a file that identifies exactly which contacts caused the import failure and where within the contact the issue occurred.

Figure 4:
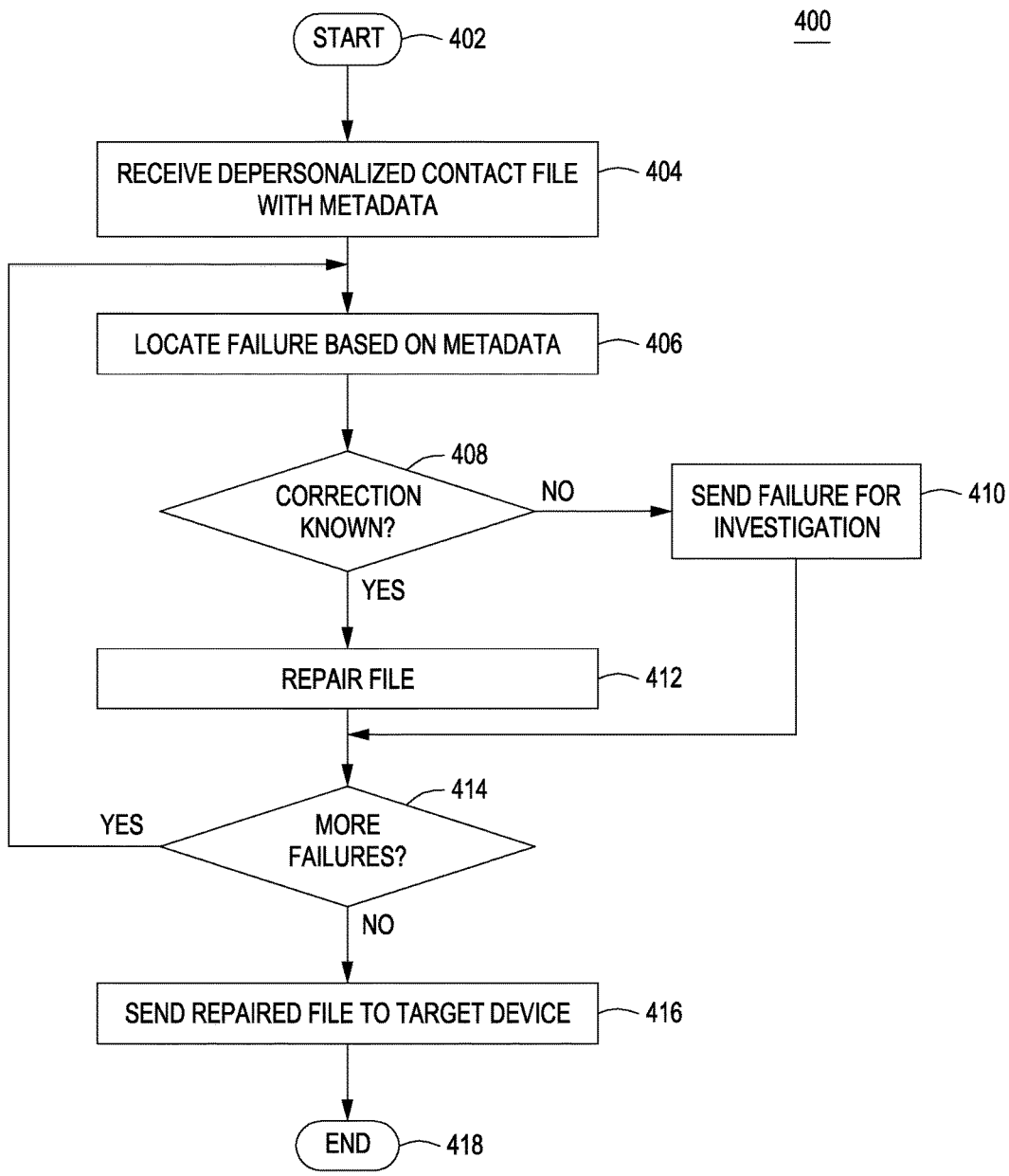
FIG. 4 is a flow diagram depicting a method for remote correction of invalid contact file syntax, in accordance with one or more embodiments of the present invention.

FIG. 4 is a flow diagram depicting a method 400 for remote correction of invalid contact file syntax, in accordance with one or more embodiments of the present invention. The method 400 starts at step 402 and proceeds to step 404.

At step 404, the depersonalized file of contacts as well as the file that includes device information and metadata identifying the locations of failures is received at a remote server. Device information includes a make, model and firmware version of the target device where the failure occurred. For example, the device may be a Samsung® Galaxy S7.

At step 406, the first failure is located based on the received metadata. For example, the first failure may have occurred in the fifth contact and the problem character is an "&" character.

At step 408, it is determined whether there is a solution to repair the issue that caused the failure. A database of known failures is accessed to determine whether a solution exists for an "&" character on the identified device. In the present example, it is determined whether there is a solution to a known failure, specifically when a Samsung Galaxy X7 attempts to import an "&" character. If the failure is found in the database, the identified solution, for example, replace "&" symbol with an "and" string, then at step 412, the solution to the depersonalized contact is applied. However, if at step 410, no solution is found, then the failure is stored in a database of unknown failures where it may be investigated and a solution provided by, for example, a software developer.

At step 414, it is determine whether more failures are identified the metadata. If more failures exist, the method proceeds to step 406, where the method iterates until at step 414, no more failures exist, at which time the method proceeds to step 416, where the repaired depersonalized file is transmitted back to the target device and the method ends at step 418.

FIG. 5 is a detailed block diagram of a computer system, according to one or more embodiments, that can be utilized in various embodiments of the present invention to implement the computer and/or the display devices, according to one or more embodiments.

Various embodiments of method and apparatus for coordinating users with common interests to attend an event together, as described herein, may be executed on one or more computer systems, which may interact with various other devices. One such computer system is computer system 500 illustrated by FIG. 5, which may in various embodiments implement any of the elements or functionality illustrated in FIGS. 1-4. In various embodiments, computer system 500 may be configured to implement methods described above. The computer system 500 may be used to implement any other system, device, element, functionality or method of the above-described embodiments. In the illustrated embodiments, computer system 500 may be configured to implement method 200 (FIG. 2), method 300 (FIG. 3), and method 400 (FIG. 4) as processor-executable executable program instructions 522 (e.g., program instructions executable by processor(s) 510) in various embodiments.

In the illustrated embodiment, computer system 500 includes one or more processors 510a-510n coupled to a system memory 520 via an input/output (I/O) interface 530. Computer system 500 further includes a network interface 540 coupled to I/O interface 530, and one or more input/output devices 550, such as cursor control device 560, keyboard 570, and display(s) 580. In various embodiments, any of the components may be utilized by the system to receive user input described above. In various embodiments, a user interface may be generated and displayed on display 580. In some cases, it is contemplated that embodiments may be implemented using a single instance of computer system 500, while in other embodiments multiple such systems, or multiple nodes making up computer system 500, may be configured to host different portions or instances of various embodiments. For example, in one embodiment some elements may be implemented via one or more nodes of computer system 500 that are distinct from those nodes implementing other elements. In another example, multiple nodes may implement computer system 500 in a distributed manner.

In different embodiments, computer system 500 may be any of various types of devices, including, but not limited to, a personal computer system, desktop computer, laptop, notebook, or netbook computer, mainframe computer system, handheld computer, workstation, network computer, a set top box, a mobile device such as a smartphone or PDA, a consumer device, video game console, handheld video game device, application server, storage device, a peripheral device such as a switch, modem, router, or in general any type of computing or electronic device.

In various embodiments, computer system 500 may be a uniprocessor system including one processor 510, or a multiprocessor system including several processors 510 (e.g., two, four, eight, or another suitable number). Processors 510 may be any suitable processor capable of executing instructions. For example, in various embodiments processors 510 may be general-purpose or embedded processors implementing any of a variety of instruction set architectures (ISAs). In multiprocessor systems, each of processors 510 may commonly, but not necessarily, implement the same ISA.

System memory 520 may be configured to store program instructions 522 and/or data 532 accessible by processor 510. In various embodiments, system memory 520 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing any of the elements of the embodiments described above may be stored within system memory 520. In other embodiments, program instructions and/or data may be received, sent or stored upon different types of computer-accessible media or on similar media separate from system memory 520 or computer system 500.

In one embodiment, I/O interface 530 may be configured to coordinate I/O traffic between processor 510, system memory 520, and any peripheral devices in the device, including network interface 540 or other peripheral interfaces, such as input/output devices 550. In some embodiments, I/O interface 530 may perform any necessary protocol, timing or other data transformations to convert data signals from one component (e.g., system memory 520) into a format suitable for use by another component (e.g., processor 510). In some embodiments, I/O interface 530 may include support for devices attached through various types of peripheral buses, such as a variant of the Peripheral Component Interconnect (PCI) bus standard or the Universal Serial Bus (USB) standard, for example. In some embodiments, the function of I/O interface 530 may be split into two or more separate components, such as a north bridge and a south bridge, for example. Also, in some embodiments some or all of the functionality of I/O interface 530, such as an interface to system memory 520, may be incorporated directly into processor 510.

Network interface 540 may be configured to allow data to be exchanged between computer system 500 and other devices attached to a network (e.g., network 590), such as one or more display devices (not shown), or one or more external systems or between nodes of computer system 500. In various embodiments, network 590 may include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 540 may support communication via wired or wireless general data networks, such as any suitable type of Ethernet network, for example; via telecommunications/telephony networks such as analog voice networks or digital fiber communications networks; via storage area networks such as Fiber Channel SANs, or via any other suitable type of network and/or protocol.

Input/output devices 550 may, in some embodiments, include one or more communication terminals, keyboards, keypads, touchpads, scanning devices, voice or optical recognition devices, or any other devices suitable for entering or accessing data by one or more computer systems 500. Multiple input/output devices 550 may be present in computer system 500 or may be distributed on various nodes of computer system 500. In some embodiments, similar input/output devices may be separate from computer system 500 and may interact with one or more nodes of computer system 500 through a wired or wireless connection, such as over network interface 540.

In some embodiments, the illustrated computer system may implement any of the methods described above, such as the methods illustrated by the flowcharts of FIG. 2, FIG. 3, and FIG. 4. In other embodiments, different elements and data may be included.

Those skilled in the art will appreciate that computer system 500 is merely illustrative and is not intended to limit the scope of embodiments. In particular, the computer system and devices may include any combination of hardware or software that can perform the indicated functions of various embodiments, including computers, network devices, Internet appliances, PDAs, wireless phones, pagers, and the like. Computer system 500 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 500 may be transmitted to computer system 500 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium or via a communication medium. In general, a computer-accessible medium may include a storage medium or memory medium such as magnetic or optical media, e.g., disk or DVD/CD-ROM, volatile or non-volatile media such as RAM (e.g., SDRAM, DDR, RDRAM, SRAM, and the like), ROM, and the like.

The methods described herein may be implemented in software, hardware, or a combination thereof, in different embodiments. In addition, the order of methods may be changed, and various elements may be added, reordered, combined, omitted or otherwise modified. All examples described herein are presented in a non-limiting manner. Various modifications and changes may be made as would be obvious to a person skilled in the art having benefit of this disclosure. Realizations in accordance with embodiments have been described in the context of particular embodiments. These embodiments are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

While the foregoing is directed to embodiments of the present invention, other and further embodiments of the invention may be devised without departing from the basic scope thereof, and the scope thereof is determined by the claims that follow.

What is claimed is:

1. A method of providing remote correction of invalid contact file syntax, the method comprising:
   receiving a file comprising information associated with one or more contacts;
   processing the received file on a target device to import the one or more contacts; and
   in response to an import failure:
   depersonalizing the received file of contact information by removing any identifying information from the file;
   identifying a location within one or more contacts the depersonalized file which caused the import failure, wherein the location is stored as metadata;
   transmitting the depersonalized file and the metadata to a remote server for repair; and
   receiving a repaired depersonalized file;
   repairing the received file of contacts based on the repaired depersonalized file;
   importing the repaired file of contacts on the target device.

2. The method of claim 1, wherein the file of contacts is a SyncML file.

3. The method of claim 1, wherein depersonalizing the received file of contact information comprises performing a one-way hash of randomized character replacement for alpha-numeric characters in the received file and storing the depersonalized contacts.

4. The method of claim 3, wherein identifying a location within one or more contacts comprises:
   (i) attempting to import each of the one or more contacts in the depersonalized file;
   (ii) identifying a depersonalized contact that causes an import failure;
   (iii) replacing in a contact from the received file a first alpha-numeric character with a randomly selected alpha-numeric character, wherein the contact from the received file corresponds to the identified depersonalized contact that caused the import failure;
   (iv) attempting to import the contact from the received file;
   (v) storing the contact and a location of the replaced character when an import failure occurs; and
   (vi) repeating the processes of steps (iii)-(v) for each character in the contact in the received file.

5. The method of claim 4, where in the replacing, attempting to import, and storing steps are repeated with two characters replacements at one time, three characters replacements at one time, four character replacements at one time, until all characters of the contact are randomly replaced and successfully imported.

6. The method of claim 1, transmitting further comprises:
   identifying device information for the device where the import failed, wherein device information includes a make, model, and firmware version; and
   storing the device information with the metadata.

7. The method of claim 1, wherein repaired file includes replacements for characters that caused the import failure.

8. The method of claim 1, further comprising transmitting the repairs to a source device where the file of contacts was received.

9. A computer-implemented method of repairing a file of contacts comprising:
   receiving a file of contacts and metadata that identifies one or more locations within the file that caused import failures;
   identifying from the metadata, device information for the device where the import failures occurred;
   identifying, based on the metadata, one or more characters that caused the import failure at an identified location in the file of contacts;
   determining whether a solution exists for repairing the one or more characters found at a first location based on the identified device; and
   repairing the characters based on the solution when a solution is found for the one or more characters on the identified device.

10. The method of claim 9, further comprising storing the file of contacts and metadata in a database for further investigation when a solution is not found.

11. The method of claim 9, further comprising transmitting the repaired file of contacts to the device where the import failures occurred.

12. The method of claim 9, wherein the device information defines a make, model and firmware version of the device where the import failure occurred.

13. A system of providing remote correction of invalid contact file syntax, comprising:
   a) at least one processor;
   b) at least one input device; and
   c) at least one storage device storing processor-executable instructions which, when executed by the at least one processor, perform a method including:
   receiving a file comprising information associated one or more contacts;
   attempting to import the received file on a target device;
   in response to an import failure:
   depersonalizing the received file of contact information by removing any identifying information from the file;
   identifying a location within one or more contacts the depersonalized file which caused the import failure, wherein the location is stored as metadata;
   transmitting the depersonalized file and the metadata to a remote server for repair; and
   receiving the repaired depersonalized file;
   repairing the received file of contacts based on the repaired depersonalized file; and
   importing the file of contacts on the target device.

14. The system of claim 13, wherein the file of contacts is a SyncML file.

15. The system of claim 13, wherein depersonalizing the contact information comprises performing a one-way hash of randomized character replacement for alpha-numeric characters in the received file and storing the depersonalized contacts.

16. The system of claim 15, wherein identifying a location within one or more contacts comprises:
  (i) attempting to import each of the one or more contacts in the depersonalized file;
  (ii) identifying a depersonalized contact that causes an import failure;
  (iii) replacing in a contact from the received file a first alpha-numeric character with a randomly selected alpha-numeric character, wherein the contact from the received file corresponds to the identified depersonalized contact that caused the import failure;
  (iv) attempting to import the contact from the received file;
  (v) storing the contact and a location of the replaced character when an import failure occurs; and
  (vi) repeating the processes of steps (iii)-(v) for each character in the contact in the received file.

17. The system of claim 16, where in the replacing, attempting to import, and storing steps are repeated with two characters replacements at one time, three characters replacements at one time, four character replacements at one time, until all characters of the contact are randomly replaced and successfully imported.

18. The system of claim 13, transmitting further comprises:
  identifying device information for the device where the import faded, wherein device information includes a make, model, and firmware version; and
  storing the device information with the metadata.

19. The system of claim 13, wherein repaired file includes replacements for characters that caused the import failure.

20. The system of claim 13, further comprising transmitting the repairs to a source device where the file of contacts was received.

* * * * *